United States Patent [19]
Inazuru

[11] Patent Number: 5,860,584
[45] Date of Patent: Jan. 19, 1999

[54] METHOD OF BONDING AMORPHOUS CARBON MATERIAL WITH METAL MATERIAL OR CERAMIC MATERIAL AND ELECTRON TUBE DEVICE

[75] Inventor: Tutomu Inazuru, Hamamatsu, Japan

[73] Assignee: Hamamtsu Photonics K.K., Hamamatsu, Japan

[21] Appl. No.: 879,651

[22] Filed: Jun. 20, 1997

Related U.S. Application Data

[62] Division of Ser. No. 560,358, Nov. 17, 1995, Pat. No. 5,812,633.

[30] Foreign Application Priority Data

Jan. 19, 1995 [JP] Japan .......................... 7-6582

[51] Int. Cl.$^6$ .................................. B23K 31/02
[52] U.S. Cl. .................. 228/121; 228/124.1; 228/124.5; 228/124.6
[58] Field of Search ................. 228/121, 122.1, 228/124.1, 124.5, 124.6, 203, 246, 250

[56] References Cited

U.S. PATENT DOCUMENTS

| | | | |
|---|---|---|---|
| 4,774,140 | 9/1988 | Wakasa et al. | 428/408 |
| 4,933,557 | 6/1990 | Perkins et al. | 250/505.1 |
| 5,021,284 | 6/1991 | Miwa et al. | 428/166 |
| 5,173,612 | 12/1992 | Imai et al. | 250/505.1 |
| 5,317,618 | 5/1994 | Nakahara et al. | 378/161 |
| 5,326,607 | 7/1994 | Muramatsu et al. | 428/65 |

FOREIGN PATENT DOCUMENTS

| | | |
|---|---|---|
| 0 476 827 | 3/1992 | European Pat. Off. . |
| 43 01 146 | 7/1993 | Germany . |
| 63-310778 | 12/1988 | Japan . |
| 64-2225 | 1/1989 | Japan . |
| 4-321570 | 11/1992 | Japan . |
| 5-299044 | 11/1993 | Japan . |

OTHER PUBLICATIONS

Patent Abstracts of Japan, "Electron Begin Transmission-Window", Publication No. JP2138900, Pub. Date May 28, 1990, vol. 14, No. 372.

*Primary Examiner*—Samuel M. Heinrich
*Attorney, Agent, or Firm*—Pillsbury Madison & Sutro LLP

[57] ABSTRACT

The object of the invention is to provide a bonding method for brazing an amorphous carbon (AC) material to a metal material or a ceramic material, and to provide an electron tube device having an input/output window made of the amorphous carbon material. The surface of the amorphous carbon (AC) material is roughened to form an irregularity. A brazing material is sandwiched between the amorphous carbon material and a metal material or ceramic material. The resultant structure is heated to braze the amorphous carbon material to the metal material or ceramic material. The electron tube device includes a sealed vessel having an opening portion, a peripheral portion of which is made of a metal material or a ceramic material. The electron tube device further includes a window, made of an amorphous carbon material and bonded to the peripheral portion of the opening portion with a brazing material, and having irregularity on a surface around the opening portion.

5 Claims, 5 Drawing Sheets

METHOD OF BONDING AMORPHOUS CARBON MATERIAL WITH METAL MATERIAL OR CERAMIC MATERIAL AND ELECTRON TUBE DEVICE

This is a division of application Ser. No. 08/560,358 filed Nov. 17, 1995, now U.S. Pat. No. 5,812,633.

BACKGROUND OF THE INVENTION

1. Field of the Invention

The present invention relates to a method of bonding amorphous carbon material with metal material or ceramic material, and further relates to X ray electron tube devices having an window of amorphous carbon film.

2. Related Background Art

As a window material for an X-ray electron tube device, glass, aluminum, titanium, beryllium, and the like have been conventionally used. In particular, as an input/output window material for an X-ray electron tube that uses soft X-rays having a low energy, beryllium has been used mainly from the viewpoint of X-ray permeability.

Carbon is also known as a material having a very soft X-ray permeability next to that of beryllium. Also, recently, a carbon material called amorphous carbon (AC) which has a very dense structure and physical characteristics, e.g., a bending strength and a bulk density that sufficiently endure to maintain a high vacuum, so that it can be used as the input/output window material of an electron tube device when formed as a thin film, has become commercially available.

SUMMARY OF THE INVENTION

As described above, glass, aluminum, and the like are not appropriate as the input/output window material of an X-ray electron tube device in a low-energy soft X-ray range due to their X-ray permeability. Although the X-ray permeability can be increased to a certain degree by decreasing the thickness of the window material, the strength of the window material poses a problem in this case. Although beryllium does not have a problem in the X-ray permeability and strength, the inherent toxicity and high cost are pointed out as posing problems. Accordingly, as the material of the input/output window of an X-ray electron tube device that uses soft X-rays having a low X-ray energy, a material which is low in cost and highly safe (having a low toxicity) and a sufficient strength has been sought.

As described earlier, in general, a carbon material has a high X-ray permeability next to that of beryllium and is free from the problems of the toxicity and cost associated with beryllium. However, when a carbon material is manufactured or processed, or used as the input/output window surface of an X-ray electron tube device, e.g., an X-ray image intensifier (I.I.), an X-ray phototube, an X-ray proportional counter, a GM tube, and the like, several problems arise. More specifically, black lead or graphite present a problem in terms of moisture permeability or air permeability and are thus not satisfactory in maintaining a sufficient internal airtightness of an electron tube. Although a diamond crystal has no problem in this respect, it is difficult to manufacture an input/output surface having a large area with a diamond crystal.

In comparison, amorphous carbon (AC) is a carbon material having a very dense structure, has a low toxicity and a low cost, and can maintain a high vacuum very well, thus having characteristics suitable as the window material of an X-ray electron tube. Accordingly, if this AC material can be used as the input/output window material of an X-ray electron tube, a window material having a lower toxicity and a lower cost than those of the conventional beryllium material can be provided.

In order to use the AC as the input/output window material of the electron tube, several technical problems need to be resolved. For example, to use the AC material as the window material of an X-ray electron tube device, the following conditions should be satisfied: the window is preferably formed into a film as thin as possible to increase the X-ray permeability; the window should have a sufficiently high mechanical strength when using this device in practice; an arbitrary metal should be able to be formed by vapor deposition on the surface of the window when required, and the window should should be able to endure several processing conditions in the manufacture of the device. Accordingly, there has been a need to develop a method of bonding the AC material with the window frame material that sufficiently satisfies particularly these conditions. More specifically, bonding airtightness maintaining properties, heat-resistant processing properties, and a bonding strength that satisfy a high airtightness, a high heat resistance, and the like during the manufacture and use, are required. In general, in the manufacture of the electron tube device, a residual gas generated from the interior of a material in the tube after the electron tube has been manufactured sometimes decreases the vacuum degree in the tube as time passes, thus shortening the service life of the electron tube. Thus, a heating degassing process under a high vacuum is preferable. For this purpose, heating at 700° C. or more at a high vacuum is usually required. Thus, a low-melting metal, e.g., an indium seal, is not appropriate for bonding the AC window material with the window frame material. Also, an organic material contained seal member is also inappropriate for sufficient degassing. More specifically, in the heating step, decomposition of the seal member or a trace amount of volatile impurity makes it difficult to achieve sufficient degassing. Therefore, the above bonding operation is most preferably performed by brazing employing an appropriate metal brazing material.

As the AC material itself, ones whose distributions of the bulk density and porosity differ can be utilized. However, as the window material of the electron tube device, the larger the bulk density and the smaller the porosity, the better. For example, an AC material whose porosity is substantially zero is commercially available and accessible.

The surface of an AC, an AC film, or a film having these characteristics is usually very smooth and hard. Accordingly, it is difficult to bond such an AC material with, e.g., a metal window material in accordance with brazing by using an ordinary metal brazing material.

Several methods are conventionally developed for bonding a carbon material other than the AC with a metal by brazing. For example, several methods are known as the brazing method of crystalline carbon and a metal (e.g., Japanese Patent Laid-Open Nos. 64-2225, 4-321570, and 4-321570). Regarding brazing of an amorphous carbon material with a metal material, it is known to provide a stress relaxation layer simultaneously with bonding to relax the stress generated during bonding, as disclosed in Japanese Patent Laid-Open No. 63-310778. However, regarding a method of bonding a material, e.g., a metal with an AC material, an AC, or a film having the above-described properties necessary as the window of the device described above, a sufficiently effective method has not yet been found.

The present inventors conducted an extensive study of the above problems, and discovered a bonding method of the AC material with a metal material or a ceramic material by means of brazing, so that an amorphous carbon material (AC), in particular an AC film or film, can be used as the input/output window material of an electron tube device.

Furthermore, the present inventors manufactured several types of X-ray electron tube devices, in particular several types of electron devices suitably used with soft X-rays, that use a sufficiently thin AC film as the input/output window material by employing the above bonding method.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The present invention relates to a method of bonding an amorphous carbon material with a metal material or a ceramic material, comprising the first step of roughening one surface of the amorphous carbon material, thereby forming irregularity, and the second step of sandwiching a brazing material between the surface of the amorphous carbon material which is treated in the first step and the metal material or ceramic material, and heating a resultant structure, thereby performing brazing.

The present invention also relates to a bonding method wherein the surface roughening is performed by spraying an abrasive.

The present invention also relates to a bonding method wherein the surface roughening is performed by mechanical abrasion using an abrasive.

The present invention also relates to a bonding method wherein the brazing material is a silver solder selected from Ag—Cu—Ti, Ag—Sn—Ti, and Ag—Cu—In—Ti solders.

The present invention also relates to a bonding method wherein the brazing material is preferably a titanium solder selected from Ti—Zr—Cu—Ni and Ti—Zr—Cu.

The present invention relates to an electron tube device having an input/output window which is bonded by brazing an AC material according to the present invention with a metal or ceramic window frame material. That is, the present invention relates to an electron tube device having a sealed space, comprising a vessel having an opening portion, a peripheral portion of which is made of a metal material or a ceramic material, and a window, made of an amorphous carbon material and bonded to the peripheral portion of the opening portion through a brazing material, and having irregularity on a surface around the opening portion.

The present invention also relates to an electron tube device wherein the irregularity of the surface of the amorphous carbon material is formed by spraying an abrasive.

The present invention also relates to an electron tube device wherein the irregularity of the surface of the amorphous carbon material is formed by mechanical abrasion using an abrasive.

The brazing material is a silver solder selected from Ag—Cu—Ti, Ag—Sn—Ti, and Ag—Cu—In—Ti.

Alternatively, the brazing material is a titanium solder selected from Ti—Zr—Cu—Ni and Ti—Zr—Cu.

The present invention also relates to an electron tube device having an input/output window having the above characteristic features, and comprising means for emitting electrons, means for accelerating the emitted electrons toward an X-ray generating metal target provided in the vessel, and means for focusing the emitted electrons on a surface of the target, wherein the generated X-rays are output through the window.

The present invention also relates to an electron tube device wherein a gas that is ionized by the X-rays incident through a window is sealed in the space, and the device has means for amplifying ionization of the gas.

The present invention also relates to an electron tube device comprising means for converting X-ray quanta incident through an input/output window having the above characteristic features into photoelectrons, means for accelerating the photoelectrons obtained by conversion toward a phosphor screen, arranged on the vessel, for obtaining an optical image, and means for focusing the photoelectrons obtained by conversion on a phosphor screen, arranged on the vessel, for obtaining an optical image.

The present invention also relates to an electron tube device comprising means for converting X-ray quanta incident through an input/output window having the above characteristic features into photoelectrons, means for multiplying the photoelectrons obtained by conversion, and means for detecting the multiplied photoelectrons.

The present invention will be described in detail.

Bonding Method

An amorphous carbon material that can be used in the bonding method according to the present invention is a carbon material called amorphous carbon (AC), the characteristic feature of which is being amorphous. Carbon materials showing various physical properties are commercially available and accessible in accordance with the manufacturing conditions and the like. The AC material can have a plate-like shape, a rod-like shape, a film-like shape, or a specific shape in accordance with the application, and can also be formed into an appropriate shape in accordance with the manufacturing conditions of the material. In the present invention, as the material of the input/output window of an electron tube device, an AC film or a film is mainly used. However, the bonding method according to the present invention does not particularly limit the shape of the AC film or film, but can be suitably used in ACs having various types of shapes as described above.

The basic physical properties of the AC material are the bulk density, the porosity, the bending strength, the modulus in flexure, the resistivity, the coefficient of thermal expansion, the thermal conductivity, the Shore hardness, the residual ash content, and the like. An AC material having a porosity of about 3% to substantially 0% can be selected in accordance with the manufacturing conditions of the AC, and an AC material having a bulk density of about 1.43 to about 1.55 can be selected. For the application of the material of the input/output window of the electron tube device, an AC material having a porosity as small as possible, i.e., a bulk density as large as possible is suitably used to maintain the airtightness of the interior of the electron tube. Regarding the strength, for example, the bending strength of the AC materials ranges from 1,000 kg/cm$^2$ or less to about 2,300 kg/cm$^2$, and an AC material having a suitable bending strength can be selected. The modulus in flexure ranges from about 2,100 kg/cm$^2$ to about 3,000 kg/cm$^2$, and an AC material having a suitable modulus in flexure can be selected. In general, the surface of an AC is hard and very smooth. For example, regarding the Shore hardness, some AC has a Shore hardness of 100 or more, in particular about 130.

Therefore, when using the AC as the input/output window material of the electron tube device according to the present invention, the thinner the film, the more preferable from the viewpoint of the X-ray input/output efficiency. Also, a strength that can sufficiently endure the manufacturing conditions and application conditions of the device should be maintained. An optimal AC satisfying these conditions can be selected.

Figure 1:
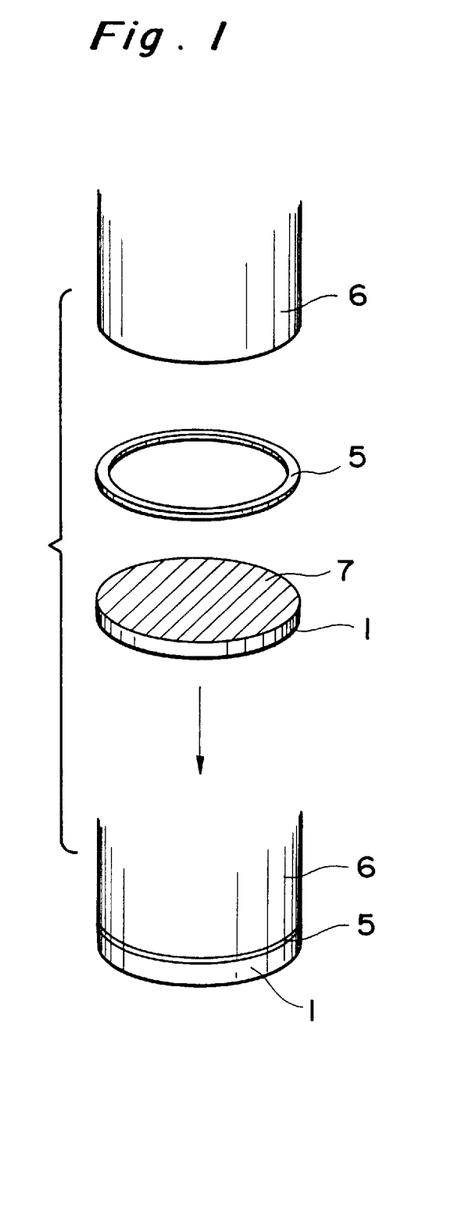
FIG. 1 shows manufacture of an input/output window in which the surface of an amorphous carbon film is roughened and the amorphous carbon film is brazed to a metal window frame or a ceramic window frame by using a brazing material.

As shown in FIG. 1, the bonding method according to the present invention is a brazing method of the above AC material with various types of metals or non-metallic materials by employing a metal solder. This method includes roughening the surface to be brazed of the AC material as the indispensable step. The problem of a general method that performs bonding by brazing the surface of the AC material is that, since the surface of the AC material is hard and very smooth, as described above, a molten metal brazing material cannot substantially achieve sufficiently high wetting properties. In fact, when an (Ag—Cu—Ti based) molten brazing material is placed on the surface of the AC material, a contact angle ($\theta$) becomes almost 180° (the contact angle $\theta$, a surface tension $\gamma_s$ of the AC, the surface tension $\gamma_1$ of the molten brazing material, and an interfacial tension $\gamma_{s1}$ between the solid and liquid phases satisfy a relationship $\gamma_s = \gamma_{s1} + \gamma_1 \cos \theta$). When the surface of the AC material is actually observed with a scanning electron microscope (SEM), merely slight gentle undulation is observed even with a magnification of 5,000×, indicating that the surface is very smooth and free from irregularity, cracks, pits, and the like. This surface state is not substantially changed by an ordinary surface cleaning operation.

Figure 2A:
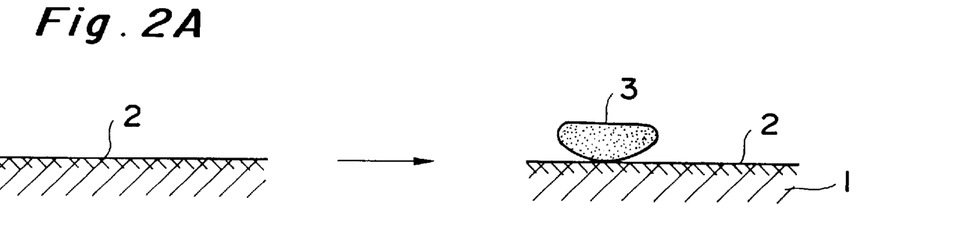
FIG. 2A shows the irregularity and the wetting properties, after the brazing material is melted, of the surface of an amorphous material when the surface of the amorphous material is not roughened.

Accordingly, as is schematically shown in FIGS. 2A to 2D, with an AC surface 1 whose surface is not treated, a molten brazing material 3 cannot bury in the irregularity of the AC, and bonding with mechanical intermeshing is difficult to achieve (FIG. 2A). A bonding strength obtained by mechanical intermeshing should be introduced by performing an appropriate surface treatment. The first major object of surface treatment of the present invention is to introduce sufficient irregularity on the AC surface so that the molten brazing material buries in the irregularity, thereby enabling bonding with sufficient mechanical intermeshing after cooling.

The second major object of surface treatment of the present invention is to remove various types of oxides 2 formed on the surface of the AC material by surface treatment. An AC is generally manufactured by processing an appropriate organic substance at a high pressure and a high temperature. During this processing, various types of complicated organic oxides may be formed near the surface. Accordingly, the presence of an oxide film can further interfere with the wetting properties of the molten brazing material. By this removing operation, the oxide near the surface of the AC is removed, so that an internal amorphous carbon material 1 is exposed to the bonding surface. As a result, when an appropriate brazing material, e.g., a brazing material containing Ti, is selected, Ti and exposed C form TiC or the like near the interface of the brazing material and the AC to introduce chemical bonding of Ti and C, thus increasing the bonding strength when combined with the mechanical intermeshing bonding described above.

Figure 2B:
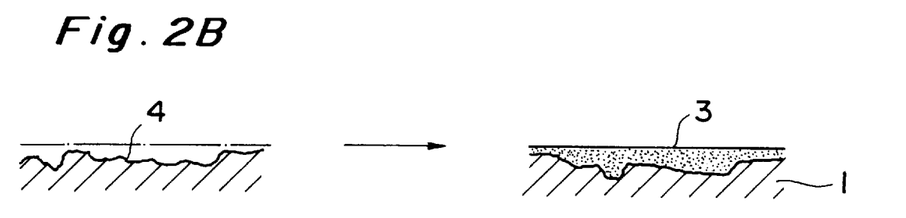
FIG. 2B shows the irregularity and the wetting properties, after the brazing material is melted, of the surface of the amorphous material when the surface of the amorphous carbon is roughened.

As described above, in this step, the surface of the AC material which is originally very smooth and hard is treated to remove the various types of oxide films 2 from the surface of the AC, thus exposing a new carbon material surface 4. At the same time, when the brazing material is melted in a later step, the brazing material 3 is imparted with wetting properties so that it sufficiently buries in fine irregularities. After cooling, the brazing material 3 is solidified, so that a very high bonding strength is obtained by complex operations (FIG. 2B).

In fact, after surface treatment to be described later is performed, when a molten (Ag—Cu—Ti based) brazing material is placed on the surface of the AC material, the contact angle $\theta$ becomes almost 0°. More specifically, the molten brazing material wets the surface almost completely, and the brazing material which is solidified after cooling is bonded very firmly. When the brazing material is to be actually removed in this state, the AC surface is sometimes destroyed.

The degree, method, and the like of optimal surface treatment according to the present invention depends on the physical properties and shape of the employed AC material, the employed brazing material, and the like. The method of evaluating the surface roughness, which should be conducted, after surface treatment, is not particularly limited in the present invention. Direct observation using the SEM is possible. This direct observation is possible in various types of surface roughness measurements as well. For example, in SEM observation, the position, ratio, and the degree of the irregularity of the surface to be treated can be evaluated. Alternatively, evaluation can be performed by means of $R_{max}$, $R_a$, and the like based on probing (JIS B 0601-1970; "Kikai Keisoku" by Osamu TANIGUCHI, Yokendo, pp. 77–80, 1970). In fact, in the surface treatment according to the present invention shown in the first embodiment, a roughness of about 10 μm to 1,000 μm at $R_{max}$ is introduced. At $R_a$, a roughness of about 1 to 100 μm is introduced.

The optimization of the degree and method of surface treatment can be selected and determined based on, e.g., the design of experiment which is an ordinary knowledge to the person skilled in the art. For example, this selection and determination can be made by performing surface treatment under various conditions by employing an AC which is to be actually used, melting various types of brazing materials which are to be used on the obtained surfaces, directly observing the wetting properties, and measuring the bonding strengths after cooling.

In the present invention, surface roughening of the AC surface is not particularly limited, and various types of known surface abrasion with which irregularities are formed on the AC surface can be employed. In general, treatment can be performed in the form of either dry or wet treatment. More particularly, as the dry treatment, an abrasive is sprayed onto the surface of the AC to introduce irregularity (sandblasting), or the surface of the AC is mechanically abraded with an abrasive (e.g., carborundum), sandpaper, or the like to introduce irregularity. As the abrasive, carborundum having 400 to 2,000 meshes may be particularly preferably employed based on the surface hardness of the AC of the present invention.

As the wet treatment, a slurry-like abrasive kneaded with water (e.g., carborundum having 400 to 2,000 meshes is preferably employed as the abrasive) may be used. Either treatment can be suitably employed. A surface treating method and the degree of treatment can be selected by an optimum combination of the characteristics (the bulk density, the porosity, the bending strength, the modulus in flexure, and the like) of the AC to be employed and brazing materials to be employed described below.

Optimization of surface treatment can be confirmed through evaluation of the wetting properties and actual measurement of the bonding strength by placing part of the brazing material to be actually used on the surface-treated AC film and heating the AC film in a heating furnace. Through surface roughening described above, a peel/adhesion strength of at least 10 kg/cm$^2$ can be obtained, depending on the characteristics of the AC film. If required, a bonding strength of 800 kg/cm$^2$ or more can be obtained. This value almost corresponds to the bending strength (800 to 2,300 kg/cm$^2$) of the AC film, and is thus supposed to be sufficient when using the AC film in an electron tube device. Accordingly, the peel/adhesion strength according to the present invention is preferably at least 10 kg/cm$^2$, more preferably 100 kg/cm$^2$ or more, and most preferably 800 kg/cm$^2$ or more.

Evaluation of the surface roughness after treatment can be performed by means of $R_{max}$ based on, e.g., probing (JIS B 0601-1970; "Kikai Keisoku" by Osamu TANIGUCHI, Yokendo, pp. 77–80, 1970). Regarding roughness of the surface treatment of the present invention, irregularity of at least 10 μm to 1,000 μm at $R_{max}$ are formed. At $R_a$, a surface roughness of 1 to 100 μm is introduced. Therefore, according to the present invention, the degree of the surface irregularity formed by surface treatment is about 10 μm to 1,000 μm at $R_{max}$, preferably about 100 μm to 1,000 μm at $R_{max}$, and more preferably 500 μm to 1,000 μm at $R_{max}$. At $R_a$, a roughness of about 1 to 100 μm is preferable, more preferably about 10 to 100 μm, and most preferably about 50 to 100 μm.

The degree of surface treatment can be monitored by microscopic observation during surface roughening. With microscopic observation (with a magnification of about 1,000×), it can be easily confirmed that the AC surface is abraded by the surface roughening method of the present invention, thus forming the irregularity.

In the present invention, it suffices if a portion to be surface-treated is at least a portion which is to be brazed afterwards, and surface treatment need not be performed for the entire surface of the AC material. Meanwhile, it is desirable to treat another partial surface of the AC film for the purpose of forming a metal film by vapor deposition in a later step or to treat the entire surface of the material to relax distortion caused by brazing when the AC film is very thin. For this purpose, the above surface treatments can be performed simultaneously. The thickness of the AC film can be adjusted simultaneously when performing the surface treatment. This is an effective process in optimizing the surface treatment to form a window material of a desirable electron tube.

In the present invention, the brazing material that can be used with the surface-treated AC material is not particularly limited. An optimum brazing material can be selected in accordance with the composition of the AC material and the temperature at which the brazing material is used.

When the heat resistance of the AC film is considered, the brazing material preferably has a melting point of about 500° to 1,000° C., and a brazing material having a melting point of about 600° to 900° C. can be suitably used. In the present invention, the type of the brazing metal material is not particularly limited. A conventional silver solder, a titanium solder, and the like can be suitably used. In particular, in the present invention, (1) a silver solder selected from Ag—Cu—Ti, Ag—Sn—Ti, and Ag—Cu—In—Ti, and (2) a titanium solder selected from Ti—Zr—Cu—Ni and Ti—Zr—Cu can be suitably used. In the present invention, Ti is not always necessarily contained in the brazing material. In order to obtain a higher bonding strength, it is preferable to use a brazing material containing Ti.

Figure 2C:
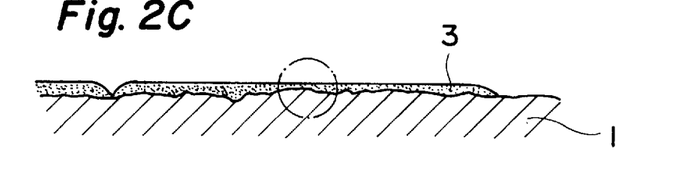
FIGS. 2C and 2E show a bonding surface obtained when a Ti-containing solder is used.
Figure 2D:
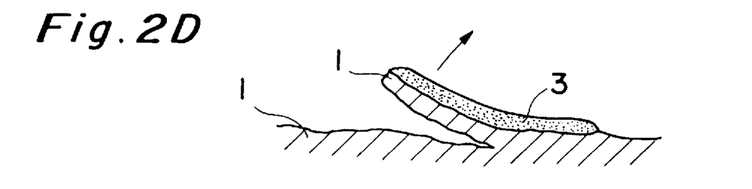
FIG. 2D shows a peeled state.
Figure 2E:
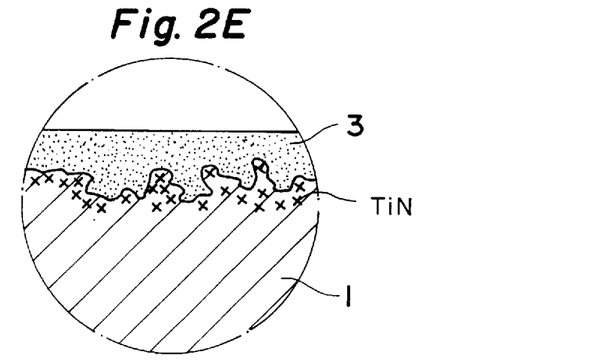

According to the findings of the present inventors, when a silver solder containing 2 wt % of Ti is used, formation of a TiC component is confirmed near the bonding surface of the silver solder and the AC in accordance with Auger electron spectroscopy (AES) (FIGS. 2C and 2E). TiC is formed to a thickness of about 1,000 Å, although the thickness differs depending on locations (formation of TiC was observed even at a depth of about 2,000 Å from the bonding surface). This can be explained when it is assumed that Ti in the brazing material reacts under brazing conditions with a carbon component portion exposed by surface treatment of the present invention, thus forming TiC. For this reason, a TiC layer or portion is supposed to be formed near the bonding portion, thus considerably increasing the bonding strength. In fact, it was qualitatively observed that the larger the bonding strength of a bonding portion, the larger the thickness of the formed TiC layer. In this case, the bonding strength can become equal to or larger than the peel strength of the AC material itself. More specifically, when the bonding portion is peeled, the bonding portion is not peeled but rather the AC material is destroyed (FIG. 2D). Therefore, when the AC is used as the input/output window material of an electronic device, the bonding portion has a sufficiently large strength.

Therefore, more specifically, in the present invention, a silver solder which is particularly an Ag—Cu—Ti-, Ag—Cu—Sn—Ti-, or Ag—Cu—In—Ti-based brazing material is further preferably used. When such a silver solder is employed, it preferably contains about 2% of Ti. As the titanium solder, a Ti—Zr—Cu—Ni- or Ti—Zr—Cu-based solder is preferably used, and one containing 25 to 40 wt % of titanium is more preferably used.

Other materials, e.g., the material of the input/output window frame member of an electron tube device, which is bonded by the bonding method of the present invention is not particularly limited. These materials can be selected by utilizing the standards of bonding with an ordinary brazing material. For example, various types of metal materials or ceramic materials can be used. For example, a metal material, e.g., a Kovar metal, an iron-chromium alloy, an iron-nickel alloy, and stainless steel (SUS 304); or an aluminum oxide-, zirconium oxide-, silicon nitride-, or silicon carbide-based ceramic material can be brazed well.

In particular, depending on the selected metal bonded with the AC film by brazing, a distortion occurs due to shrinkage caused by heat applied during brazing, and thus the AC film can sometimes be deformed or destroyed. In order to avoid this phenomenon, part or the entire portions of the two surfaces of the AC film may be similarly surface-treated, as described above, so that the resultant distortion can be relaxed. Alternatively, an appropriate metal for relaxing the distortion may be bonded, so that the resultant distortion can be relaxed.

When such a distortion relaxation metal is sandwiched and bonded, various types of materials for an electron tube device can be selected. Furthermore, in the present invention, other conditions regarding brazing of the surface-treated AC with other materials are not particularly limited. In particularly, if required, it is preferably to apply an appropriate pressure across the AC and the other material, since such pressure makes bonding reliable and holds the shape after brazing within a desirable range. It is also preferable not to quickly cool the surface but to gradually cool the surface in the cooling step.

Electron Tube Device

The electron tube device according to the present invention has a window made of an amorphous carbon material (AC). Thus, the electron tube device absorbs less radiation energy, e.g., X-rays, through the amorphous carbon window, and can input and output radiation, e.g., X-rays, with a high input/output efficiency. In particular, when soft X-rays having a low energy are employed, the energy is less absorbed or scattered through the amorphous carbon window, and can be input/output with a high input/output efficiency. For this purpose, the thinner the AC window, the higher the efficiency. In this case, however, the mechanical strength is decreased, and a trouble may occur in handling during use. Therefore, although AC windows having various types of shapes can be used, one having a shape called a glass-like carbon film having a thickness of about 1 mm is particularly preferably used. An AC film having a thickness of 0.8 mm or less, and in particular 0.5 mm or less (0.1 mm or more) can also be suitably used.

The window according to the present invention can be applied to the X-ray output window of an X-ray generating tube, and in particular, a soft X-ray generating tube, and to the input window for X-rays, and in particular soft X-rays, of a proportional counter, a GM tube, an X-ray image intensifier, and an X-ray photomultiplier. When such an electronic device employs an amorphous carbon material window as the X-ray input/output window, the radiation energy, e.g., the X-rays, is less observed by the amorphous carbon window, and a radiation, e.g., X-rays, can be input/output at a high input/output efficiency. In particular, when soft X-rays having a low energy are employed, the energy is less absorbed by the amorphous carbon window, and can be input/output with a particularly high input/output efficiency.

When the AC input/output window according to the bonding method of the present invention is used, the bonding portion of the AC window member and the window frame member can sufficiently endure the manufacturing conditions during the manufacture of the various types of electron tube devices described above. For example, these manufacturing conditions are high-vacuum airtightness under heating in various types of degassing steps, vapor deposition properties of the metal film onto the surface of the window, chemical inertness against the bottled gas, and the like.

In the manufacture of an electron tube device described above, the degassing step is indispensable and is usually performed by heating at a high vacuum and 700° to 800° C. Accordingly, the bonding method of the present invention can sufficiently endure this high vacuum condition. The high vacuum condition is maintained by the high density and the porosity, which is substantially 0, of the selected AC film.

A target metal for generating X-rays can be directly formed on the AC window surface by vapor deposition or the like, thus enabling more efficient manufacture of X-ray generating tubes. When, however, metal vapor deposition is generally performed on an AC film, if the AC surface treatment is not performed, a problem similar to that of the wetting properties of the brazing material occurs, and the metal film formed by vapor deposition may not have a sufficiently high peel strength. When the surface treatment according to the present invention is performed, the peel strength of metal film formed by vapor deposition is increased, thus enabling stable operation.

The AC material is stable against various types of so-called chemical reactive gases, and is also stable against a corrosive gas, e.g., bromide gas used in the GM tube. Thus, the AC material makes a particularly good window member also from the viewpoint of safety and the like.

The present invention will be described in more detail by way of its preferred examples. Note that the present invention is not limited to these examples.

EXAMPLE 1

Bonding Method of AC Film and Metal Material

As schematically shown in FIG. 1, the surface of an AC film (amorphous carbon film available from Nisshinbo Industries, Inc.) 1 having a thickness of 0.2 mm and a diameter of 25 mm is sandblasted (for example, by spraying silicon carbide having 400 meshes for 10 minutes or more with high-pressure air using a Neumablaster manufactured by Kabushiki Kaisha Fuji Seisakusho), thus obtaining a roughened surface 7. A silver solder (608T manufactured by Tokyo Braze: containing 72 wt % of Ag, 26 wt % of Cu, and 2 wt % of Ti) is sandwiched between the AC film 1 and a frame 6 (inner diameter: 23 mm, outer diameter: 25 mm, height: 10 mm) made of a Kovar metal, and is heated to 830° C. for 1 hour in a vacuum heating furnace of $5 \times 10^{-6}$ Torr with a weight (not shown) of 40 g placed thereon. Thereafter, the temperature is decreased to room temperature through 4 hours.

EXAMPLE 2

X-ray Generating Tube Employing AC Film Having Ti Target Film as Window Member

Figure 3:
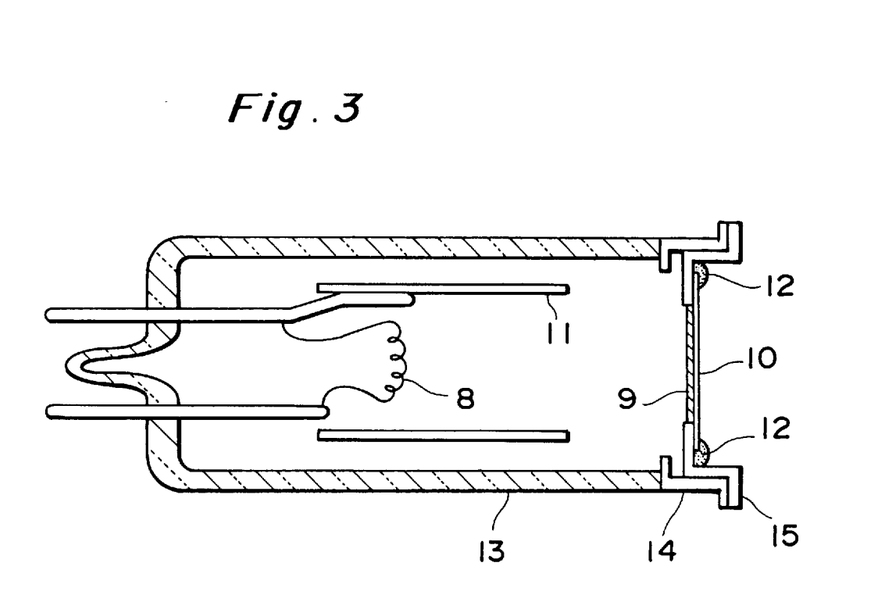
FIG. 3 is a sectional view of an X-ray generating tube having, as the output window, an amorphous carbon film on which a Ti metal film is formed by vapor deposition as the target.

FIG. 3 shows the arrangement of an X-ray generating tube employing an AC film having a Ti target film as the window member. In this X-ray generating tube, a window frame 15 bonded with an X-ray output AC film window 10 by brazing defines a sealed space through a flange 14 together with an electron tube body vessel 13. An electron generating filament 8 and focusing electrodes 11 for accelerating and focusing generated electrons are arranged in the sealed space. An X-ray generating Ti metal target film 9 is formed on the inner surface of the AC film window by vapor deposition.

The filament 8 is heated to emit thermoelectrons. The thermoelectrons are accelerated toward the Ti target by an electric field applied across the filament 8 and the AC film window 10 as they are focused by the focusing electrodes 11, and bombarded against the Ti target, thereby generating X-rays. The generated X-rays are output from the AC film window. As the X-rays are not absorbed much by the AC film, this X-ray generating tube has a high efficiency.

For example, this X-ray generating tube is fabricated as follows.

The two surfaces of the AC film (amorphous carbon film available from Nisshinbo Industries, Inc.) 10 having a thickness of 0.2 mm and a diameter of 25 mm are sand-blasted (for example, by spraying silicon carbide having 400 meshes for 10 minutes or more with high-pressure air using a Neumablaster manufactured by Kabushiki Kaisha Fuji Seisakusho), thus obtaining the AC film window 10 with a roughened surface.

A silver solder (608T manufactured by Tokyo Braze: containing 72 wt % of Ag, 26 wt % of Cu, and 2 wt % of Ti) 12 is sandwiched between the AC film 10 and a window frame 15 made of a Kovar metal, and is heated to 800° C. for 1 hour in a vacuum heating furnace of $5 \times 10^{-6}$ Torr with a weight (not shown) of 50 g placed thereon. Thereafter, the temperature is decreased to room temperature through 4 hours.

A Ti layer is formed as a target metal on the surface of the AC film window 10 that forms an inner surface of the electron tube by vacuum deposition, thus forming a layer 9 having a thickness of about 2,000 Å. The Kovar metal window frame 15 bonded with the obtained AC film window is welded to the electron tube body 13 through the Kovar metal flange 14. The filament 8, the focusing electrodes 11, and a getter (not shown) are provided in the electron tube body. The obtained electron tube is evacuated (to $10^{-6}$ to $10^{-8}$ Torr) and is baked at 450° C. for 12 hours, thus performing degassing. After ageing of 12 hours, the obtained electron tube is separated from the discharging base.

In the obtained X-ray generating tube, the target metal is directly provided to the AC film window, and the thermoelectrons generated by the filament 8 are bombarded against the target 9 as they are accelerated and focused, thus generating X-rays. The generated X-rays, including low-energy soft X-rays, are less absorbed by the AC film, and can be output from the AC film window efficiently.

EXAMPLE 3

X-ray Proportional Counter Employing AC Film as Window Member

Figure 4:
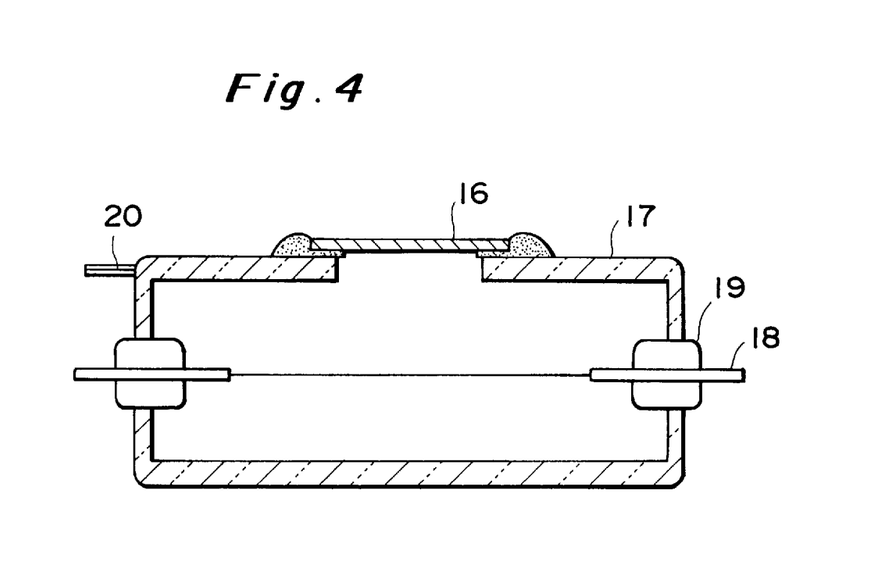
FIG. 4 is a sectional view of an X-ray proportional counter having an amorphous carbon film as the input window.

FIG. 4 shows the arrangement of an X-ray proportional counter employing an AC film as the window member. This X-ray proportional counter has a space sealed by an AC film 16 bonded as an X-ray input window to an electron tube body vessel 17 serving as the cathode by brazing, an insulator 19 supporting an anode 18, and the electron tube body vessel 17. An ionizing gas (not shown) is sealed in this space.

X-rays input through the AC window ionize the ionizing gas in the electron tube and are ion-amplified by a high voltage applied across the anode and cathode. Ionized anions are attracted by the metal vessel 17 holding a cathode 20, and ionized cations are attracted by the anode 18, thereby generating an output signal proportional to the input X-ray amount.

For example, this X-ray proportional counter is fabricated in the following manner.

The two surfaces of the AC film (amorphous carbon film available from Nisshinbo Industries, Inc.) 16 having a thickness of 0.2 mm and a diameter of 30 mm are treated by using a carborundum slurry (for example, the AC film surface is mechanically polished for about 30 minutes by using a slurry containing 50% of 400-mesh carborundum particles), and is washed and dried, thus obtaining the AC film window 16 with a roughened surface.

By using a silver solder (608T manufactured by Tokyo Braze: containing 72 wt % of Ag, 26 wt % of Cu, and 2 wt % of Ti), the AC film 16 and a body 17 of the stainless steel tube are bonded (by heating to 800° C. for 1 hour in a vacuum heating furnace of $10^{-6}$ Torr and thereafter decreasing the temperature to room temperature through 4 hours). Furthermore, the anode 18 is provided in the body 17 through the insulator 19, and the cathode 20 is provided to the body. This assembly is evacuated (to $10^{-6}$ to $10^{-8}$ Torr) and baked at 450° C. for 12 hours (400° C., 8 hours), thus performing degassing. Then, Xe gas and $CO_2$ are introduced (about 600 Torr), and the assembly is separated from the discharging base.

As the anode, those conventionally used in an X-ray proportional counter can be used. For example, a metal wire made of, e.g., Pt or W, can be used. As the sealed gas, Ne, Kr, Ar, Xe, or the like can be used as ionizing gas, and methane, $CO_2$, or the like can be used as the quenching gas.

By employing the arrangement shown in this example, when the voltage applied across the two electrodes are set to a predetermined value and the type of the sealed gas is selected, this electron tube can be used as a GM tube substantially having the arrangement shown in this example. In this case, bromide gas is preferably used as the ionizing gas.

EXAMPLE 4

X-ray Image Intensifier (I.I.) Employing AC Film as Window Member

Figures 5A, 5B, 5C:
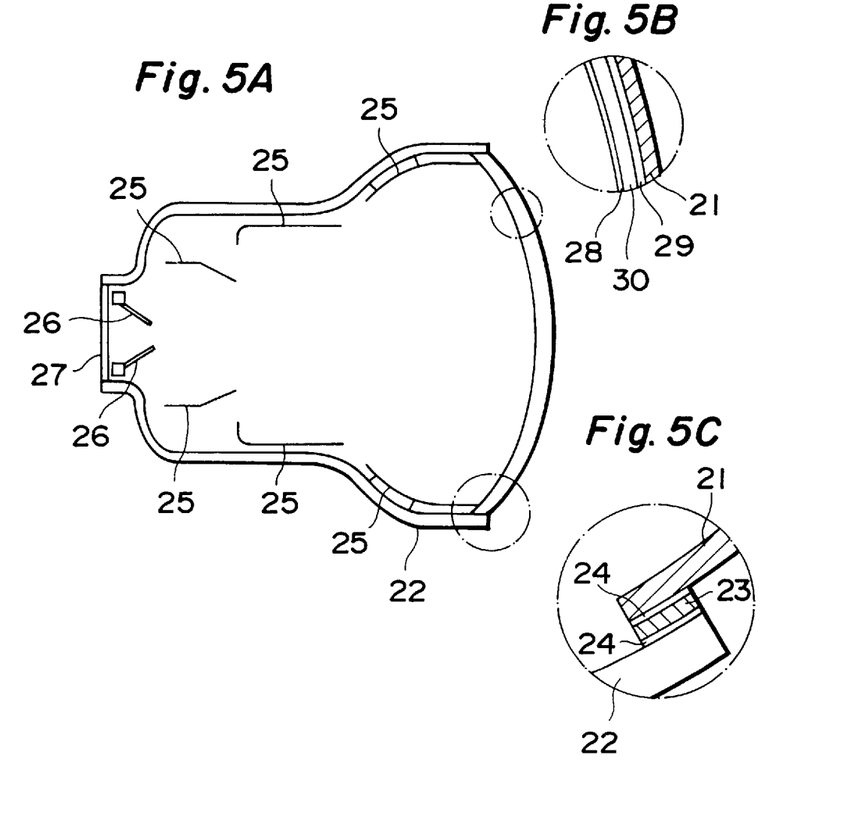
FIGS. 5A, 5B and 5C are sectional views of an X-ray image intensifier having an amorphous carbon film as the window member.

FIGS. 5A, 5B, and 5C show the arrangement of an X-ray image intensifier (I.I.) employing an AC film as an input window member.

This X-ray image intensifier (I.I.) has a space sealed by an X-ray incident AC film window 21, an output phosphor screen 27, and an electron tube body vessel 22. An input phosphor screen (made of a CsI layer 29, a transparent conductor film 30 serving as a cathode, and a photoelectric surface 28) are provided in the vicinity of the AC film window. The X-ray image intensifier also has photoelectron focusing/accelerating electrodes 25 and anodes 26.

The X-rays incident through the window 21 are absorbed and converted by the CsI scintillator 29 of the input phosphor screen formed on the inner side of the window 21, and converted into photoelectrons by the photoelectric surface 28. The photoelectrons are accelerated and focused by the voltage applied across the transparent conductor film 30 serving as the cathode of the input phosphor screen, the accelerating electrodes 25, and the anodes 26, collide with the output phosphor screen 27, and are converted from the photoelectrons into light, thus outputting an image on the output phosphor screen 27.

For example, this X-ray image intensifier (I.I.) is fabricated in the following manner.

The two surfaces of an AC film (amorphous carbon film available from Nisshinbo Industries, Inc.) 21 having a thickness of 0.5 mm and a diameter of 50 mm are sandblasted (for example, by spraying silicon carbide having 400 meshes for 10 minutes or more with high-pressure air using a Neumablaster manufactured by Kabushiki Kaisha Fuji Seisakusho), thus obtaining the AC film window 21 with a roughened surface. A SUS 304 metal window member 22 and an Ni metal 23 serving as a distortion relaxation material are sandwiched, and a silver solder (608T manufactured by Tokyo Braze: containing 72 wt % of Ag, 26 wt % of Cu, and 2 wt % of Ti) 24 is sandwiched between the AC film 21 and a metal window frame 22, and is heated to 800° C. for 1 hour in a vacuum heating furnace of $10^{-6}$ Torr. Thereafter, the temperature is decreased to room temperature through 4 hours, thus obtaining an I.I. window for the AC film 21 with a roughened surface.

A transparent conductor film consisting of the CsI film layer 29 and the indium oxide conductor film layer 30 is formed on the inner surface of the window by vapor deposition. Furthermore, the electrode bodies (accelerating and focusing electrodes) 25 and the anodes 26 are provided in the image intensifier. The CsI output phosphor screen 27 is mounted. The interior of the image intensifier is vacuum-evacuated and heated to perform degassing. Thereafter, antimony and an alkali metal (e.g., rubidium or cesium) are deposited to further form the photoelectric surface 28 on the inner side of the transparent conductor film on the inner surface of the window. The resultant assembly is separated from the discharging base.

As in this example, when the input AC surface is large (with a diameter of 40 mm or more), the AC film can be damaged due to distortion caused by a large thermal shrinkage difference of the window frame material. In order to relax distortion occurring between the AC film and the metal material or ceramic material, brazing can be performed through other metal (e.g., nickel or copper), as shown in this example.

EXAMPLE 5

X-ray Photomultiplier (PMT) Employing AC Film as Window

Figure 6A:
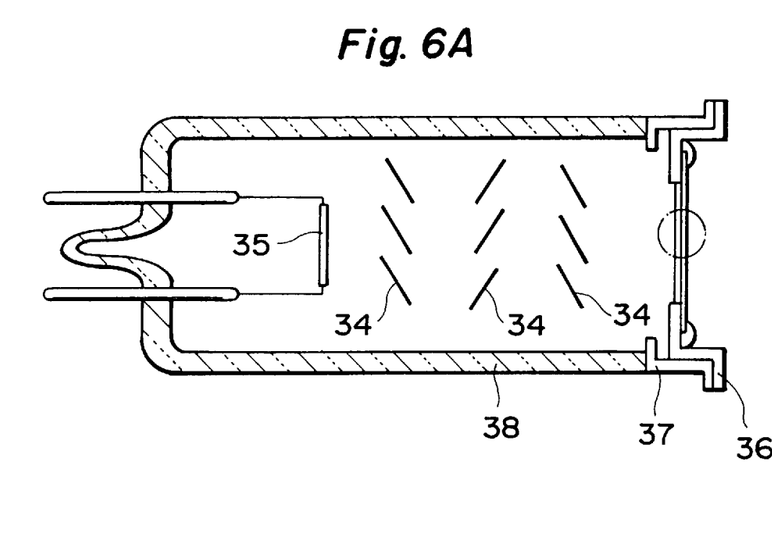
FIGS. 6A and 6B are sectional views of an X-ray photomultiplier having the amorphous carbon film as the window member.
Figure 6B:
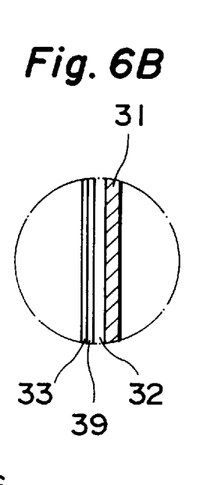

FIGS. 6A and 6B show the arrangement of an X-ray photomultiplier (PMT) employing an AC film as a window.

This X-ray photomultiplier (PMT) has a space sealed by an X-ray input AC film window 31 and an electron tube body 38. An input phosphor screen (consisting of a CsI layer 32, a transparent conductor film 39 serving as a cathode, and a photoelectric surface 33) is provided on the inner surface of the AC film window. The X-ray photomultiplier also has photomultiplying dynode electrodes 34 and cathodes.

The X-rays incident through the window 31 are absorbed by the CsI scintillator 32 of the input phosphor screen formed on the inner side of the window and converted into light. The light is then converted into photoelectrons by the photoelectric surface 33. The photoelectrons are guided by the voltage applied across the transparent conductor film 39 serving as the cathode of the input phosphor screen and the dynode electrodes 34, and multiplied. The multiplied photoelectrons are output from an anode 35 as a signal.

For example, this X-ray photomultiplier (PMT) is fabricated in the following manner.

The two surfaces of the AC film (amorphous carbon film available from Nisshinbo industries, Inc.) 31 having a thickness of 0.2 mm and a diameter of 30 mm are sandblasted (for example, by spraying silicon carbide having 400 meshes for 10 minutes or more with high-pressure air using a Neumablaster manufactured by Kabushiki Kaisha Fuji Seisakusho), thus obtaining a AC film window 31 with a roughened surface.

A silver solder (608T manufactured by Tokyo Braze: containing 72 wt % of Ag, 26 wt % of Cu, and 2 wt % of Ti) is sandwiched between the AC film 31 and a window frame 36 made of a Kovar metal, and is heated to 800° C. for 1 hour in a vacuum heating furnace of $5\times10^{-6}$ Torr with a weight (not shown) of 50 g placed thereon. Thereafter, the temperature is decreased to room temperature through 4 hours. The CsI film 32 is formed on the inner surface of the obtained AC film window 31 by vapor deposition, and is welded to the electron tube body 38 through a Kovar metal flange 37. The dynodes 34 and anode 35 are provided in the electron tube device, and the electron tube device is evacuated and heated to perform degassing. Thereafter, antimony and an alkali metal (e.g., rubidium or cesium) is deposited to further form the photoelectric surface 33 on the inner side of the CsI layer of the inner surface of the window. The obtained assembly is separated from the discharging base.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.6582/1995 filed on Jan. 19, 1995 is hereby incorporated by reference.

What is claimed is:

1. A method of bonding an amorphous carbon material to at least one member selected from the group consisting of metal materials and ceramic materials, said method comprising the steps of:

(a) roughening a surface of an amorphous carbon material and thereby forming a roughened surface of the amorphous carbon material having irregularities;

(b) inserting a brazing material between the roughened surface of the amorphous carbon material and at least one member selected from the group consisting of at least one metal material and at least one ceramic material to thereby obtain a resultant structure; and (c) heating the resultant structure to perform brazing and thereby bond the amorphous carbon material to the at least one member.

2. A method according to claim 1, wherein said step of roughening is performed by spraying an abrasive against the surface of the amorphous carbon material.

3. A method according to claim 1, wherein said step of roughening is performed by mechanical abrasion using an abrasive.

4. A method according to claim 1, wherein the brazing material is a silver solder selected from the group consisting of Ag—Cu—Ti, Ag—Sn—Ti, and Ag—Cu—In—Ti.

5. A method according to claim 1, wherein the brazing material is a titanium solder selected from the group consisting of Ti—Zr—Cu—Ni and Ti—Zr—Cu.

* * * * *